US011590552B1

(12) United States Patent
Schwab et al.

(10) Patent No.: US 11,590,552 B1
(45) Date of Patent: Feb. 28, 2023

(54) COMPACT HOSE ASSEMBLY DEVICE (71) Applicants: Richard Schwab, Perry, FL (US);
Chad Schwab, Perry, FL (US)

(72) Inventors: Richard Schwab, Perry, FL (US);
Chad Schwab, Perry, FL (US)

( * ) Notice: Subject to any disclaimer, the term of this patent is extended or adjusted under 35 U.S.C. 154(b) by 3 days.

(21) Appl. No.: 17/527,469

(22) Filed: Nov. 16, 2021

(51) Int. Cl.
*B21D 39/04* (2006.01)
*F16L 13/14* (2006.01)

(52) U.S. Cl.
CPC .......... *B21D 39/048* (2013.01); *F16L 13/141* (2013.01)

(58) Field of Classification Search
CPC ..... B21D 39/048; F16L 13/141; B25B 28/00; B25H 1/0042; B25H 1/0057; B25H 1/04; B25H 1/12; B25H 3/00; A47B 31/00; A47B 53/00
See application file for complete search history.

(56) References Cited

U.S. PATENT DOCUMENTS

2015/0115786 A1\* 4/2015 Manalang .............. A47B 31/00
312/294

\* cited by examiner

*Primary Examiner* — Lee A Holly
(74) *Attorney, Agent, or Firm* — The Rapacke Law Group, P.A.

(57) ABSTRACT

A compact hose assembly device may include a housing defining a cavity and a hingedly attached door to enclose the cavity. Within the cavity, the compact hose assembly device may include at least one sliding drawer or similar storage device. The compact hose assembly device may include an air-over-hydraulic crimping machine on a sliding drawing or substrate, the air-over-hydraulic being in operable communication with an air compressor, hydraulic foot pedal pump, and the like for operation. The compact hose assembly device may be constructed and arranged for convenient, low downtime, on-site hose repair or assembly.

20 Claims, 5 Drawing Sheets

COMPACT HOSE ASSEMBLY DEVICE

TECHNICAL FIELD

The embodiments generally relate to compact devices for hydraulic hose repair or assembly.

BACKGROUND

Hose assembly or repair, and in particular hydraulic hose assembly or repair, can create undesirable downtime or catastrophic equipment failure when not performed well and in a time efficient manner on a jobsite. Off-site solutions may allow for well-made hose assemblies at the cost of time efficient manufacturing and delivery to a jobsite.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments described herein provide a durable, service truck mountable, compact hose assembly device incorporating air-over-hydraulic crimping functionality to efficiently build hose assemblies on a job site.

The embodiments described herein additionally provide a compact hose assembly device including a housing defining a cavity and a hingedly attached door to enclose the cavity. The compact hose assembly device may include at least one sliding drawer or similar storage device. The compact hose assembly device may include an air-over-hydraulic crimping machine in operable communication with an air compressor, the air-over-hydraulic crimping machine being constructed and arranged for on-site hose repair or assembly.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

The specific details of the single embodiment or variety of embodiments described herein are to the described apparatus. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The specific details of the single embodiment or variety of embodiments described herein are set forth in this application. Any specific details of the embodiments are used for demonstration purposes only, and no unnecessary limitation or inferences are to be understood therefrom. Furthermore, as used herein, relational terms, such as "first" and "second," "top" and "bottom," and the like, may be used solely to distinguish one entity or element from another entity or element without necessarily requiring or implying any physical or logical relationship, or order between such entities or elements.

In general, the embodiments described herein provide a durable, service truck mountable, housed compact hose assembly device incorporating at least one sliding drawer, cabinet, or the like, and air-over-hydraulic crimping functionality to build or repair hose assemblies on a job site.

The embodiments described herein additionally provide a compact hose assembly device including a housing defining a cavity and at least one hingedly attached door to enclose the cavity. The at least one door may be horizontally or vertically hinged on the housing. According to some embodiments, the at least one door may include a locking mechanism constructed and arranged to allow for lockingly enclosing the cavity. The housing, door, and various other components of the compact hose assembly may be made from any suitable material such as, but not limited to, metal, wood, ceramic, composites, and the like. According to some embodiments, the compact hose assembly device is made primarily of steel. According to come embodiments, the compact hose assembly devices and various components thereof may include paint, coatings, or the like to increase aesthetic appeal or surface strength and resilience.

In some embodiments the housing may also define an upper cavity including at least one upper door hingedly attached to the top of the housing to define an enclosed upper cavity such as a toolchest, drawer, or similar enclosure. According to some embodiments, the at least one upper door may include a locking mechanism constructed and arranged to allow for lockingly enclosing the upper cavity.

The compact hose assembly device may include at least one sliding drawer or similar storage device disposed within the cavity. According to some embodiments, the compact hose assembly device may include a plurality of sliding drawers or similar storage devices and systems on corresponding drawer slides in various arrangements to allow storage of tools, supplies, or the like therein.

The compact hose assembly device may include an air-over-hydraulic crimping machine in operable communication with an air compressor, the air-over-hydraulic crimping machine being constructed and arranged for on-site hose repair or assembly.

According to some variations, the air-over-hydraulic crimping machine may be disposed on or attached to a substrate connected to drawer slides connected to the housing such that the air-over-hydraulic crimping machine may be pulled from the cavity during use and stored within the cavity when not in use.

The air-over-hydraulic crimping machine may be constructed and arranged for repairing or assembly hydraulic hose. The air-over-hydraulic crimping machine include at least one crimping die constructed and arranged to crimp a hose head or hose fitting to a hose. In some embodiments, the air-over-hydraulic crimping machine may include multiple, interchangeable crimping die to accommodate for varying hose head, hose fitting, and hose sizes. According to some embodiments, the air-over-hydraulic crimping machine may be constructed and arranged to accommodate up to one inch 4-wire and one inch 2-wire and apply up to 120 tons of crimping force.

The air-over-hydraulic crimping machine may be in operable communication with a hydraulic foot pedal pump which may be in operable communication with at least one air compressor, air regulator, or micrometer. The air-over-hydraulic crimping machine, hydraulic foot pedal pump, and air compressor may be an operable communication with one another and may be constructed and arranged for operation with crimpers, swagers, hydraulic cutters, rotary cutters, or the like via the hydraulic foot pedal. Hydraulic cutters including rotary cutters may be used to cut hose length as desired, and the air-over-hydraulic crimping machine may allow for attachment of hose fittings to cut hose, thereby allowing for on-demand hose repair or assembly on a work site.

The compact hose assembly device may be optionally mounted to a service vehicle such that on-site hose repair or assembly is time and cost effective without the need for off-site solutions.

Figure 1:
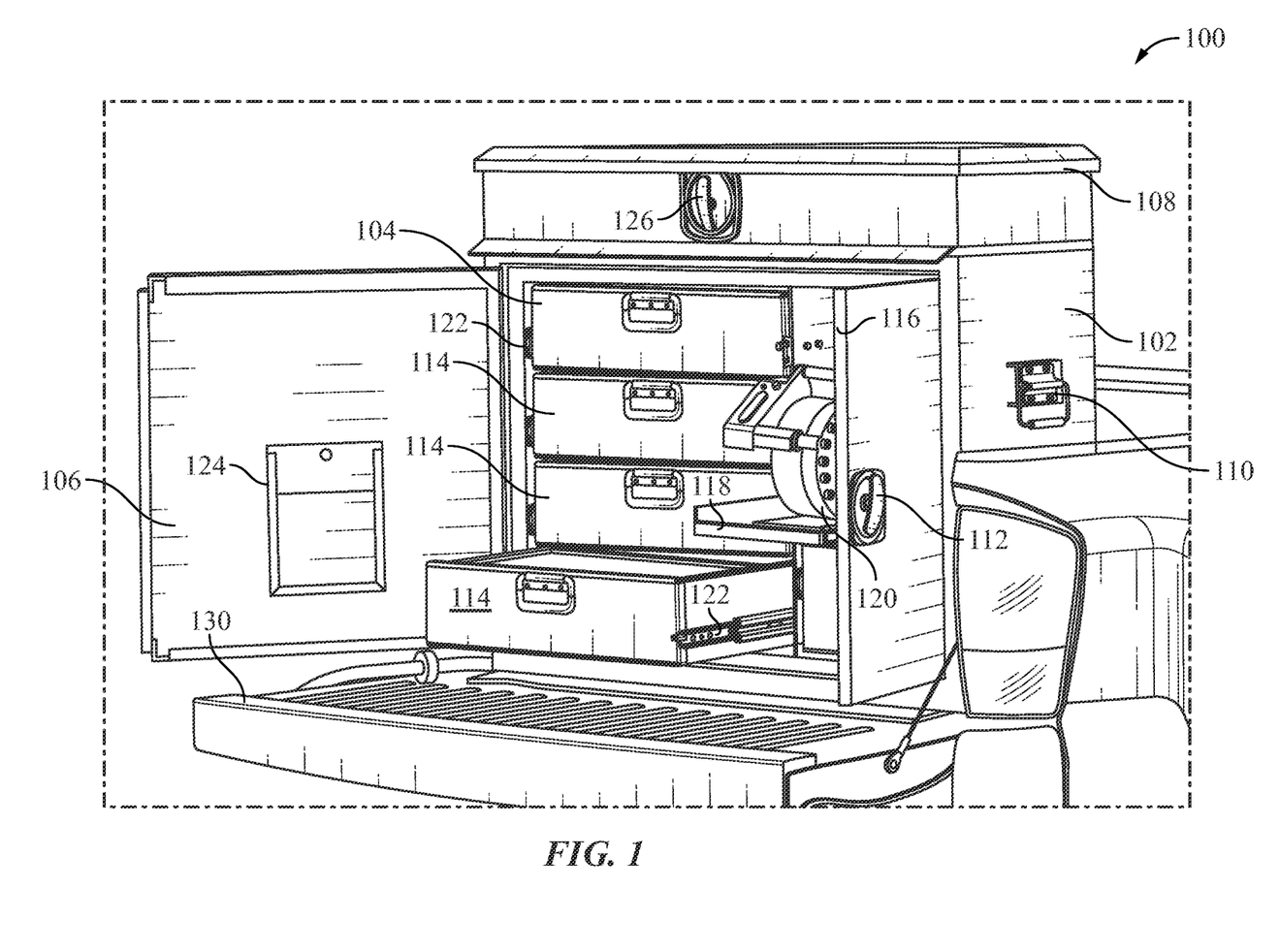
FIG. 1 illustrates one variation of a compact hose assembly device consistent with this disclosure.

Referring to FIG. 1, a compact hose assembly device 100 may include a housing 102 defining at least one cavity 104. A door 106 may be hingedly attached to the body 102 to enclose the cavity 104 and may include a first locking handle mechanism 112 for lockingly closing the door and cavity 104. The body 102 may include carrying handles 110 to facilitate movement of the compact hose assembly device 100. The door 106 may be a plurality of doors. The door 106 may include lipped compartments 124 constructed and arranged for retaining thin objects such as documents. The housing 102 may also include an upper enclosure 108 or housing defining an upper cavity and an upper door including a locking handle mechanism 126 for lockingly-closing the upper enclosure 108. The compact hose assembly device 100 may include a plurality, or at least one, drawer 114 disposed on drawer slides 122 integrated within the cavity 104. Any number of drawers 114, cabinets, or the like are contemplated by this disclosure. The compact hose assembly device 100 may further include a substrate 118 on drawer slides and an air-over-hydraulic crimping machine 120 disposed on the substrate 118. the air-over-hydraulic crimping machine 120 may be slightly removed from the compact hose assembly device 100 cavity 104 during use. the compact hose assembly device 100 may be constructed and arranged to be mounted at least partially on a surface 130 such as on a service truck or pickup truck.

Figure 2:
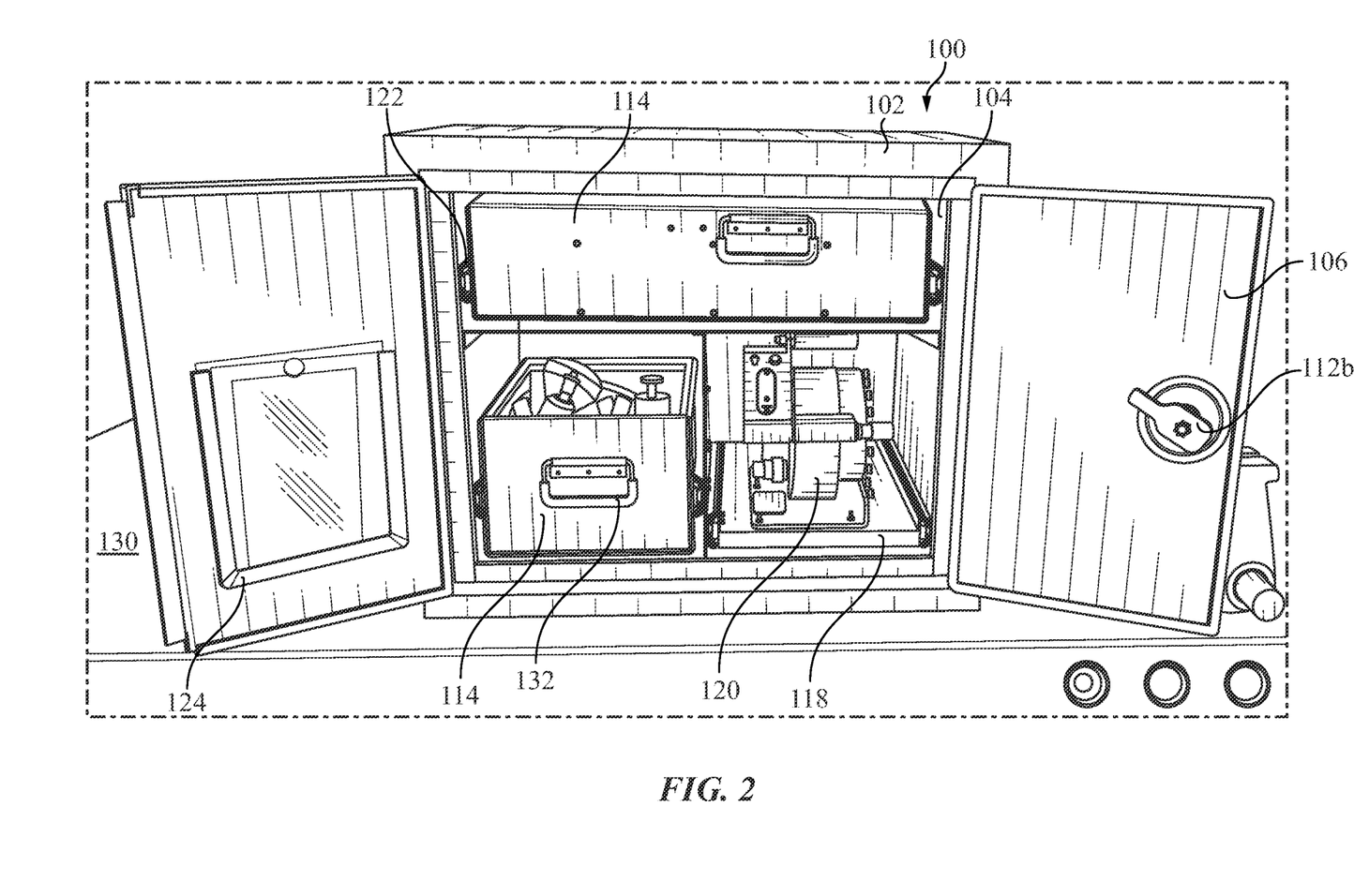
FIG. 2 illustrates one variation of a compact hose assembly device consistent with this disclosure.

Referring to FIG. 2, an alternate variation of a compact hose assembly device 100 is depicted. The device 100 may include a housing 102 defining at least one cavity 104. At least one door 106 including a first locking handle mechanism 112b may be constructed and arranged to enclose the cavity 104. At least one drawer 114 having pull handles 132 may be disposed within the cavity 104 on drawer slides 122. The compact hose assembly device 100 may further include a substrate 118 on drawer slides and an air-over-hydraulic crimping machine 120 disposed on the substrate 118. The door 106 may include lipped compartments 124 constructed and arranged for retaining objects such as documents. The compact hose assembly device 100 may be constructed and arranged to be mounted at least partially on a service vehicle 130 such as a service truck or pickup truck.

Figure 3:
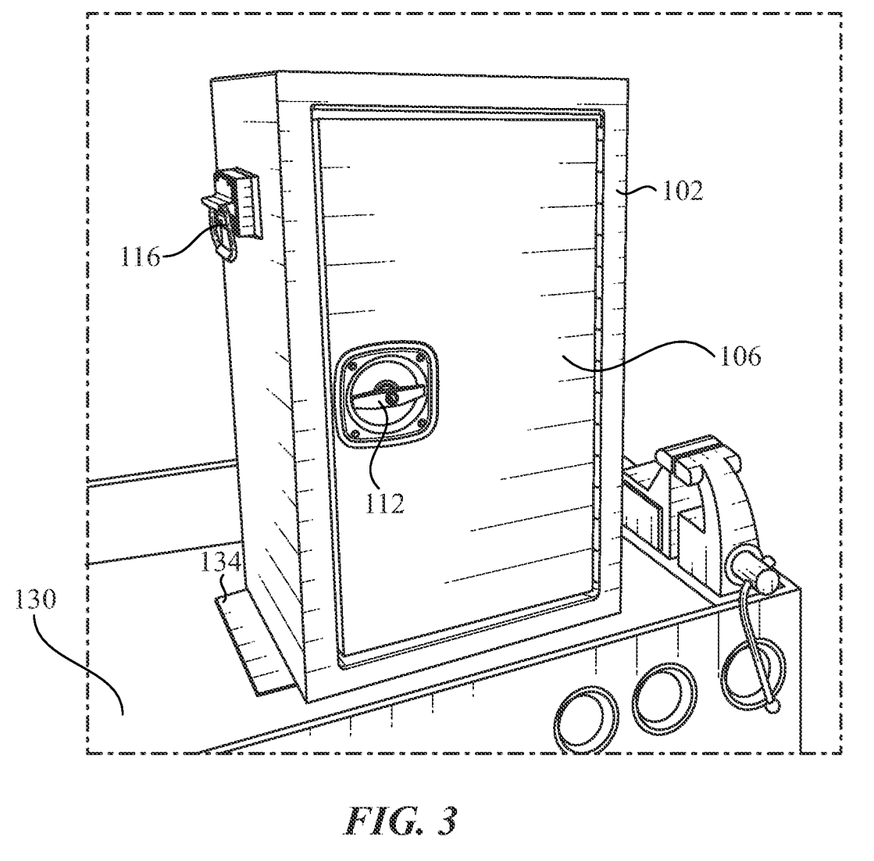
FIG. 3 illustrates one variation of a compact hose assembly device consistent with this disclosure.

Referring to FIG. 3, an alternate variation of a compact hose assembly device 100 is depicted. The device 100 may include a housing 102 defining at least one cavity and having carrying handles 116 thereon. At least one door 106 including a first locking handle mechanism 112 may be constructed and arranged to enclose the cavity. The housing 102 may include at least one mounting bracket 134 constructed and arranged to facilitate mounting of the compact hose assembly device 100 to a surface 130, such as a on service vehicle.

Figure 4:
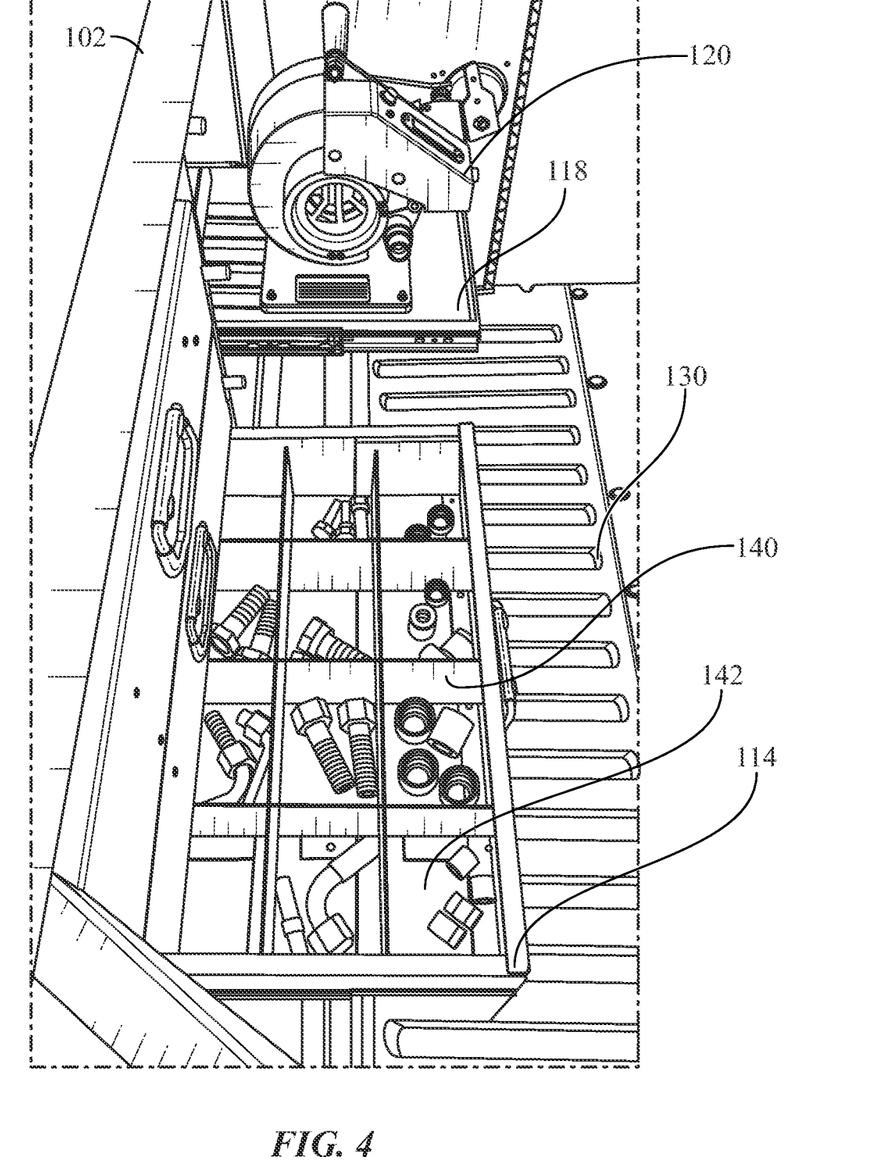
FIG. 4 illustrates one variation of a compact hose assembly device consistent with this disclosure.

Referring to FIG. 4, an alternate variation of a compact hose assembly device including a housing 102 is depicted. At least one drawer 114 may be disposed within the housing 102 and may be slightly retractable into and out of the housing 102. The at least one drawer 114 may include at least one or a plurality of separators 140 which may define at least one or a plurality of compartments 142 for storing various tools or supplies such as hose fittings in the leg. The compact hose assembly device may be mountable to a surface 130.

Figure 5:
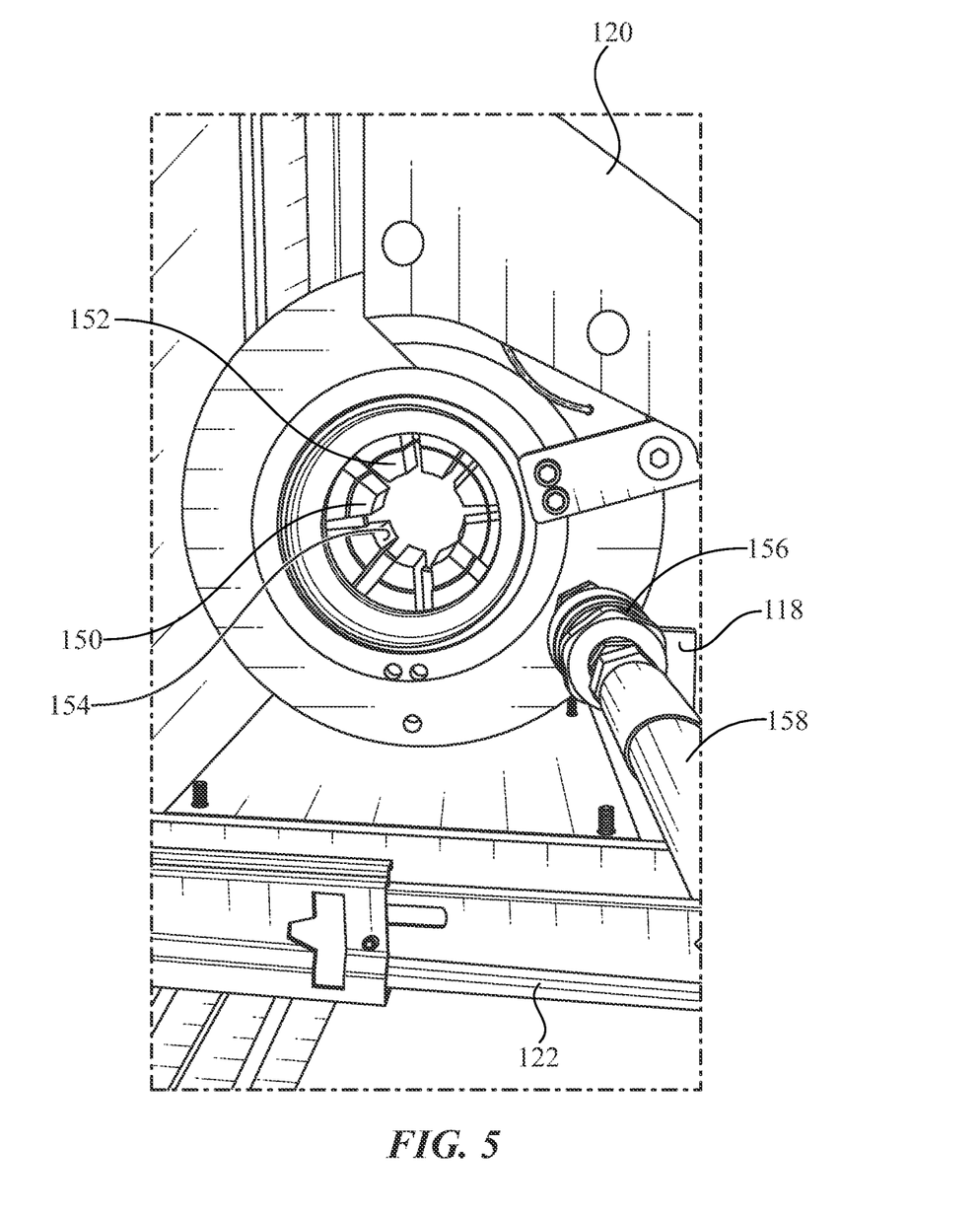
FIG. 5 illustrates one variation of an air-over-hydraulic crimping machine within one variation of a compact hose assembly device consistent with this disclosure.

Referring to FIG. 5, an air-over-hydraulic crimping machine 120 may be in operable communication with a hydraulic foot pedal pump and air compressor via an compressed air hose 158 and connection fitting 156. The air-over-hydraulic crimping machine 120 may be disposed on or securely connected to a sliding substrate 118 slidably connected to the housing via drawer slides 122. The air-over-hydraulic crimping machine 120 may include a crimping die 150 include compressible die teeth 152 which may define a bore 154. In use, the crimping die 150 may apply compressive force to a hose and hose fitting disposed within the bore 154 to secure the hose to the fitting.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a compact hose assembly device may include a housing defining a cavity; at least one door hingedly attached to the housing, the door being constructed and arranged for enclosing the cavity; at least one first locking handle mechanism constructed and arranged to lockingly close the at least one door and housing thereby enclosing the cavity; at least one drawer disposed on at least one first drawer slide integrated within the cavity; at least one substrate disposed on at least one second drawer slide integrated within the cavity; and an air-over-hydraulic crimping machine disposed on the substrate.

Variation 2 may include compact hose assembly device as in variation 1, wherein the housing includes at least one carrying handles to facilitate movement of the compact hose assembly device.

Variation 3 may include compact hose assembly device as in any of variations 1 through 2, wherein the at least one door is a plurality of doors.

Variation 4 may include compact hose assembly device as in any of variations 1 through 3, wherein the at least one first locking handle mechanism is a plurality of first locking handle mechanisms.

Variation 5 may include compact hose assembly device as in any of variations 1 through 4, wherein the plurality of first locking handle mechanisms are constructed and arranged to secure a plurality of doors together, thereby lockingly-closing the cavity.

Variation 6 may include compact hose assembly device as in any of variations 1 through 5, wherein the door including at least one lipped compartment.

Variation 7 may include compact hose assembly device as in any of variations 1 through 6, wherein the housing further includes an upper housing and upper door, the upper housing defining an upper cavity.

Variation 8 may include compact hose assembly device as in any of variations 1 through 7, further including a second locking handle mechanism for lockingly-closing the upper cavity.

Variation 9 may include compact hose assembly device as in any of variations 1 through 8, wherein the at least one drawer disposed on drawer slides integrated within the cavity is a plurality of drawers and a corresponding plurality of drawer slides.

Variation 10 may include compact hose assembly device as in any of variations 1 through 9, further including at least one mounting bracket integrated with the housing.

Variation 11 may include compact hose assembly device as in any of variations 1 through 10, wherein the at least one drawer includes at least one separator such that at least one compartment is defined within the at least one drawer.

Variation 12 may include compact hose assembly device as in any of variations 1 through 11, wherein the air-over-hydraulic crimping machine includes a crimping die defining a bore.

According to variation 13, a compact hose assembly device, may include a housing defining a cavity, the housing including an upper housing defining an upper cavity; at least one door hingedly attached to the housing, the door being constructed and arranged for enclosing the cavity; at least one upper door hingedly attached to the housing, the upper door being constructed and arranged for enclosing the upper cavity; at least one first locking handle mechanism constructed and arranged to lockingly close the at least one door and housing thereby enclosing the cavity; a plurality of drawers mechanically connected to a corresponding plurality of drawer slides integrated within the cavity; at least one substrate disposed on at least one second drawer slide integrated within the cavity; an air-over-hydraulic crimping machine disposed on the substrate, the air-over-hydraulic crimping machine including a crimping die defining a bore and being constructed and arranged to crimp a hose fitting to a hose; and at least one mounting bracket integrated with the housing, the at least one mounting bracket being constructed and arranged to facilitate mounting of the compact hose assembly device to a surface.

Variation 14 may include a compact hose assembly device as in variation 13, wherein the housing includes at least one carrying handles to facilitate movement of the compact hose assembly device.

Variation 15 may include a compact hose assembly device as in any of variations 13 through 14, wherein the housing, the at least one door, and the at least one upper door include steel.

Variation 16 may include a compact hose assembly device as in any of variations 13 through 15, further including a second locking handle mechanism for lockingly-closing the upper cavity.

Variation 17 may include a compact hose assembly device as in any of variations 13 through 16, wherein the at least one drawer includes at least one separator such that at least one compartment is defined within the at least one drawer.

Variation 18 may include a compact hose assembly device as in any of variations 13 through 17, wherein the air-over-hydraulic crimping machine is constructed and arranged to accommodate up to at least one of one inch 4-wire or one inch 2-wire.

Variation 19 may include a compact hose assembly device as in any of variations 13 through 18, wherein the air-over-hydraulic crimping machine is constructed and arranged to apply up to 120 tons of crimping force.

According to variation 20, a compact hose assembly device constructed and arranged for on-site hose repair or assembly may include a housing defining a cavity, the housing including at least one carrying handles to facilitate movement of the compact hose assembly device and an upper housing defining an upper cavity; at least one door hingedly attached to the housing, the door being constructed and arranged for enclosing the cavity; at least one upper door hingedly attached to the housing, the upper door being constructed and arranged for enclosing the upper cavity; at least one first locking handle mechanism constructed and arranged to lockingly close the at least one door and housing thereby enclosing the cavity; at least one second locking handle mechanism constructed and arranged to lockingly close the at least one upper door and upper housing thereby enclosing the upper cavity; a plurality of drawers mechanically connected to a corresponding plurality of drawer slides integrated within the cavity, wherein each of the plurality of drawers includes at least one separator such that at least one compartment is defined within each of the plurality of drawers; at least one substrate disposed on at least one second drawer slide integrated within the cavity; an air-over-hydraulic crimping machine disposed on the substrate, the air-over-hydraulic crimping machine including a crimping die defining a bore and being constructed and arranged to crimp a hose fitting to a hose and wherein the air-over-hydraulic crimping machine is constructed and arranged to accommodate up to at least one of one inch 4-wire or one inch 2-wire and apply up to 120 tons of crimping force; and at least one mounting bracket integrated with the housing, the at least one mounting bracket being constructed and arranged to facilitate mounting of the compact hose assembly device to a surface.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A compact hose assembly device, comprising:
a housing defining a cavity;
at least one door hingedly attached to the housing, the door being constructed and arranged for enclosing the cavity;
at least one first locking handle mechanism constructed and arranged to lockingly close the at least one door and housing thereby enclosing the cavity;
at least one drawer disposed on at least one first drawer slide integrated within the cavity;
at least one substrate disposed on at least one second drawer slide integrated within the cavity; and
an air-over-hydraulic crimping machine disposed on the substrate.

2. A compact hose assembly device as in claim 1, wherein the at least one door is a plurality of doors.

3. A compact hose assembly device as in claim 2, wherein the at least one first locking handle mechanism is a plurality of first locking handle mechanisms.

4. A compact hose assembly device as in claim 3, wherein the plurality of first locking handle mechanisms are constructed and arranged to secure a plurality of doors together, thereby lockingly-closing the cavity.

5. A compact hose assembly device as in claim 1, wherein the housing further comprises an upper housing and an upper door, the upper housing defining an upper cavity.

6. A compact hose assembly device as in claim 5, further comprising a second locking handle mechanism for lockingly-closing the upper cavity.

7. A compact hose assembly device as in claim 1, wherein the housing comprises at least one carrying handle to facilitate movement of the compact hose assembly device.

8. A compact hose assembly device as in claim 1, wherein the door comprises at least one lipped compartment.

9. A compact hose assembly device as in claim 1, wherein the at least one drawer disposed on drawer slides integrated within the cavity is a plurality of drawers and a corresponding plurality of drawer slides.

10. A compact hose assembly device as in claim 1, further comprising at least one mounting bracket integrated with the housing.

11. A compact hose assembly device as in claim 1, wherein the at least one drawer comprises at least one separator such that at least one compartment is defined within the at least one drawer.

12. A compact hose assembly device as in claim 1, wherein the air-over-hydraulic crimping machine comprises a crimping die defining a bore.

13. A compact hose assembly device, comprising:
a housing defining a cavity, the housing comprising an upper housing defining an upper cavity;
at least one door hingedly attached to the housing, the door being constructed and arranged for enclosing the cavity;
at least one upper door hingedly attached to the upper housing, the upper door being constructed and arranged for enclosing the upper cavity;
at least one first locking handle mechanism constructed and arranged to lockingly close the at least one door and housing thereby enclosing the cavity;
a plurality of drawers mechanically connected to a corresponding plurality of drawer slides integrated within the cavity;
at least one substrate disposed on at least one second drawer slide integrated within the cavity;
an air-over-hydraulic crimping machine disposed on the substrate, the air-over-hydraulic crimping machine comprising a crimping die defining a bore and being constructed and arranged to crimp a hose fitting to a hose; and
at least one mounting bracket integrated with the housing, the at least one mounting bracket being constructed and arranged to facilitate mounting of the compact hose assembly device to a surface.

14. A compact hose assembly device as in claim 13, wherein the housing comprises at least one carrying handles to facilitate movement of the compact hose assembly device.

15. A compact hose assembly device as in claim 13, wherein the housing, the upper housing, the at least one door, and the at least one upper door comprise steel.

16. A compact hose assembly device as in claim 13, further comprising a second locking handle mechanism for lockingly-closing the upper cavity.

17. A compact hose assembly device as in claim 13, wherein the at least one drawer comprises at least one separator such that at least one compartment is defined within the at least one drawer.

18. A compact hose assembly device as in claim 13, wherein the air-over-hydraulic crimping machine is constructed and arranged to accommodate up to at least one of one inch 4-wire or one inch 2-wire.

19. A compact hose assembly device as in claim 13, wherein the air-over-hydraulic crimping machine is constructed and arranged to apply up to 120 tons of crimping force.

20. A compact hose assembly device constructed and arranged for on-site hose repair or assembly, comprising:
a housing defining a cavity, the housing comprising at least one carrying handles to facilitate movement of the compact hose assembly device and an upper housing defining an upper cavity;
at least one door hingedly attached to the housing, the door being constructed and arranged for enclosing the cavity;
at least one upper door hingedly attached to the upper housing, the upper door being constructed and arranged for enclosing the upper cavity;
at least one first locking handle mechanism constructed and arranged to lockingly close the at least one door and housing thereby enclosing the cavity;
at least one second locking handle mechanism constructed and arranged to lockingly close the at least one upper door and upper housing thereby enclosing the upper cavity;
a plurality of drawers mechanically connected to a corresponding plurality of drawer slides integrated within the cavity, wherein each of the plurality of drawers comprises at least one separator such that at least one compartment is defined within each of the plurality of drawers;

at least one substrate disposed on at least one second drawer slide integrated within the cavity;

an air-over-hydraulic crimping machine disposed on the substrate, the air-over-hydraulic crimping machine comprising a crimping die defining a bore and being constructed and arranged to crimp a hose fitting to a hose and wherein the air-over-hydraulic crimping machine is constructed and arranged to accommodate up to at least one of one inch 4-wire or one inch 2-wire and apply up to 120 tons of crimping force; and at least one mounting bracket integrated with the housing, the at least one mounting bracket being constructed and arranged to facilitate mounting of the compact hose assembly device to a surface.

* * * * *